United States Patent
Yu et al.

(10) Patent No.: US 7,860,707 B2
(45) Date of Patent: Dec. 28, 2010

(54) COMPOUND WORD SPLITTING FOR DIRECTORY ASSISTANCE SERVICES

(75) Inventors: Dong Yu, Kirkland, WA (US);
Alejandro Acero, Bellevue, WA (US);
Yun-Cheng Ju, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1049 days.

(21) Appl. No.: 11/638,071

(22) Filed: Dec. 13, 2006

(65) Prior Publication Data
US 2008/0147381 A1    Jun. 19, 2008

(51) Int. Cl.
*G06F 17/28* (2006.01)
(52) U.S. Cl. .............. 704/4; 704/1; 704/9; 704/10; 704/246
(58) Field of Classification Search .............. 704/4, 704/1, 9, 2, 10, 246
See application file for complete search history.

(56) References Cited

U.S. PATENT DOCUMENTS

| | | | | |
|---|---|---|---|---|
| 4,890,230 A | * | 12/1989 | Tanoshima et al. | 704/3 |
| 5,839,107 A | * | 11/1998 | Gupta et al. | 704/270 |
| 2003/0097252 A1 | * | 5/2003 | Mackie | 704/9 |
| 2005/0033565 A1 | * | 2/2005 | Koehn | 704/5 |
| 2006/0004744 A1 | * | 1/2006 | Nevidomski (Alex Nevidomski) et al. | 707/4 |

\* cited by examiner

*Primary Examiner*—Qi Han
(74) *Attorney, Agent, or Firm*—Westman, Champlin & Kelly, P.A.

(57) ABSTRACT

A computer-implemented method is disclosed for improving the accuracy of a directory assistance system. The method includes constructing a prefix tree based on a collection of alphabetically organized words. The prefix tree is utilized as a basis for generating splitting rules for a compound word included in an index associated with the directory assistance system. A language model check and a pronunciation check are conducted in order to determine which of the generated splitting rules are mostly likely correct. The compound word is split into word components based on the most likely correct rule or rules. The word components are incorporated into a data set associated with the directory assistance system, such as into a recognition grammar and/or the index.

19 Claims, 5 Drawing Sheets

COMPOUND WORD SPLITTING FOR DIRECTORY ASSISTANCE SERVICES

BACKGROUND

Directory assistance (DA) services, sometimes referred to as 411 services, enable users to find out the phone number associated with a business or residential listing. Currently, automatic DA services are becoming increasingly popular. A typical automatic DA system includes a recognition component configured to determine a query based on input from a user. The system then produces a ranked set of listings that correspond to the query.

Automatic DA services can run into problems related to listings that include compound words, for example a business listing containing a single word with multiple word components (e.g., outback or payless). In simple context free grammar (CFG) based approaches (i.e., where each listing corresponds to several rules in the CFG), compound words generally won't introduce big problems into the process of identifying matching listings. However, CFG based approaches can not be scaled well to large sets of listings, such as a set of listings associated with a large city.

For large sets of listings, an approach other than a CFG approach, such as an N-gram based approach, is commonly employed. Compound words can become a problem for many of these alternative approaches, including the N-gram based approach. For example, if a user inputs "outback" but it is recognized as "out back" or "out buck," the DA system may have little or no chance of finding the desired listing, especially if the ranking index contains only "outback" for that listing.

The discussion above is merely provided for general background information and is not intended for use as an aid in determining the scope of the claimed subject matter.

SUMMARY

A computer-implemented method is disclosed for improving the accuracy of a directory assistance system. The method includes constructing a prefix tree based on a collection of alphabetically organized words. The prefix tree is utilized as a basis for generating splitting rules for a compound word included in an index associated with the directory assistance system. A language model check and a pronunciation check are conducted in order to determine which of the generated splitting rules are mostly likely correct. The compound word is split into word components based on the most likely correct rule or rules. The word components are incorporated into a data set associated with the directory assistance system, such as into a recognition grammar and/or the index.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
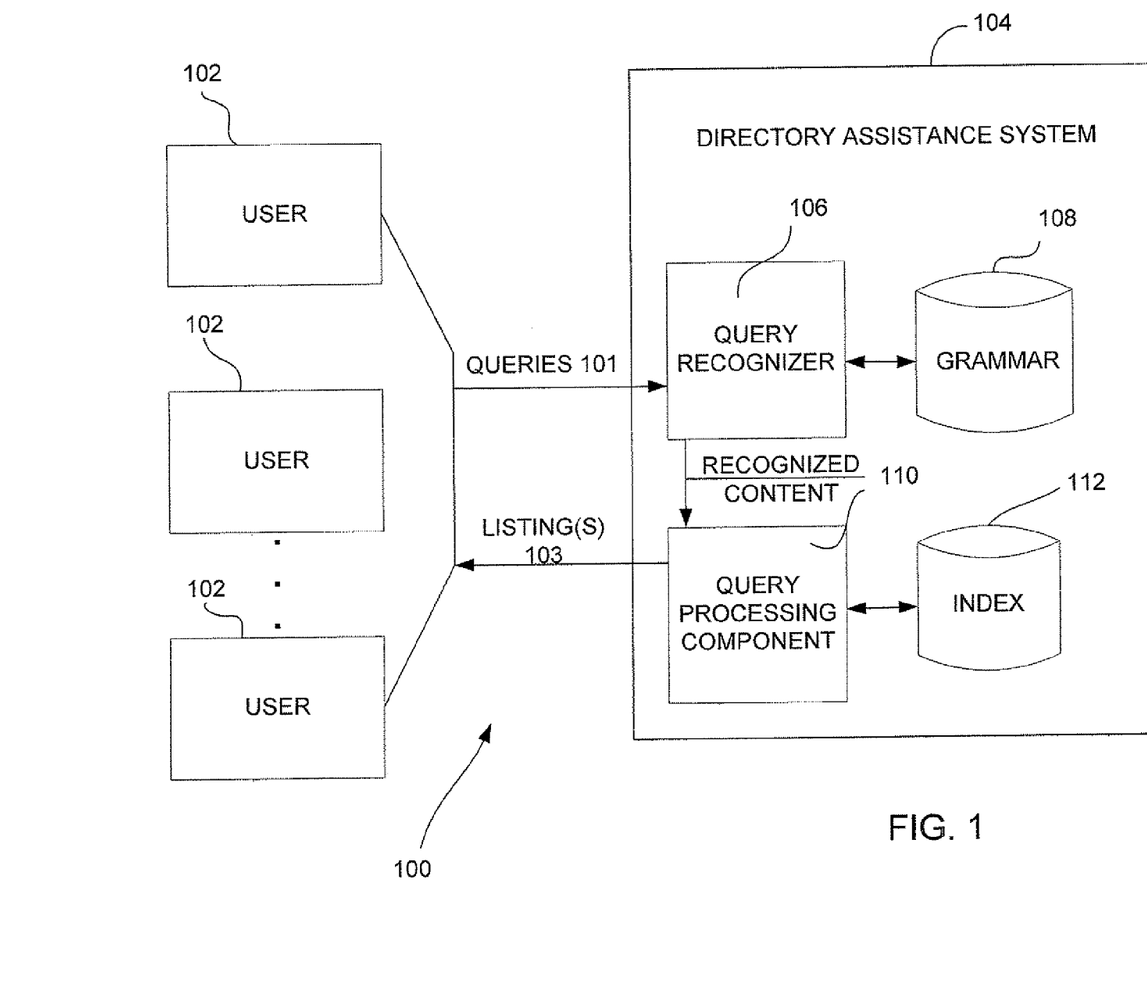
FIG. 1 is schematic diagram of a directory assistance environment.

FIG. 1 is schematic diagram of a directory assistance (DA) environment 100. Environment 100 includes a plurality of users 102 (an illustrative three are shown) that interact with a DA system 104. More specifically, users 102 submit queries 101 to system 104. System 104 processes the queries so as to produce one or more listings 103, which are returned to the user that made the corresponding request. The precise content of queries 101 and listings 103 is not critical to the present invention. That being said, in one embodiment, a query 101 is the name of a person or business, and a corresponding listing 103 is a phone number, an address, an email address or some other identifier along those lines.

Directory assistance system 104 includes a query recognizer 106 configured to process a query 101 by applying a grammar 108 so as to identify the content of the query. In one embodiment, not by limitation, query recognizer 106 is a speech recognition engine configured to apply a speech recognition grammar 108 so as to recognize the content of a query 101, which is an utterance spoken by a user 102. In another embodiment, query recognizer 106 is a handwriting recognition engine configured to apply a collection of handwriting characteristics 108 so as to recognize the content of a query 101, which is handwriting input by a user 102. In yet another embodiment, query recognizer 106 is a text recognition engine configured to apply a collection of text recognition characteristics 108 so as to recognize the content of a query 101, which is illustratively text input by a user 102. While the present invention is not limited to any particular method of recognition, solely for the purposes of illustrating embodiment of the present invention, it will be assumed that queries 101 are spoken, that query recognizer 106 is a speech recognition engine, and that grammar 108 is a speech recognition grammar.

The recognized content of a query 101 is provided to a query processing component 110. Component 110 is illustratively configured to compare the recognized content against an index of listings 112. In this manner, component 110 identifies, from the index, one or more listings that match (or sufficiently surpass a pre-established threshold of similarity) the recognized content of the query. These matching listing or listings (i.e., listings 103) are provided to the user that initiated the corresponding query 101.

Assuming DA system 104 is a typical DA system, problems can arise related to listings that include compound words, for example a business listing containing a single word with multiple word components (e.g., outback or payless). Embodiments of methods for avoiding some or all of these types of problems will now be discussed.

Figure 2:
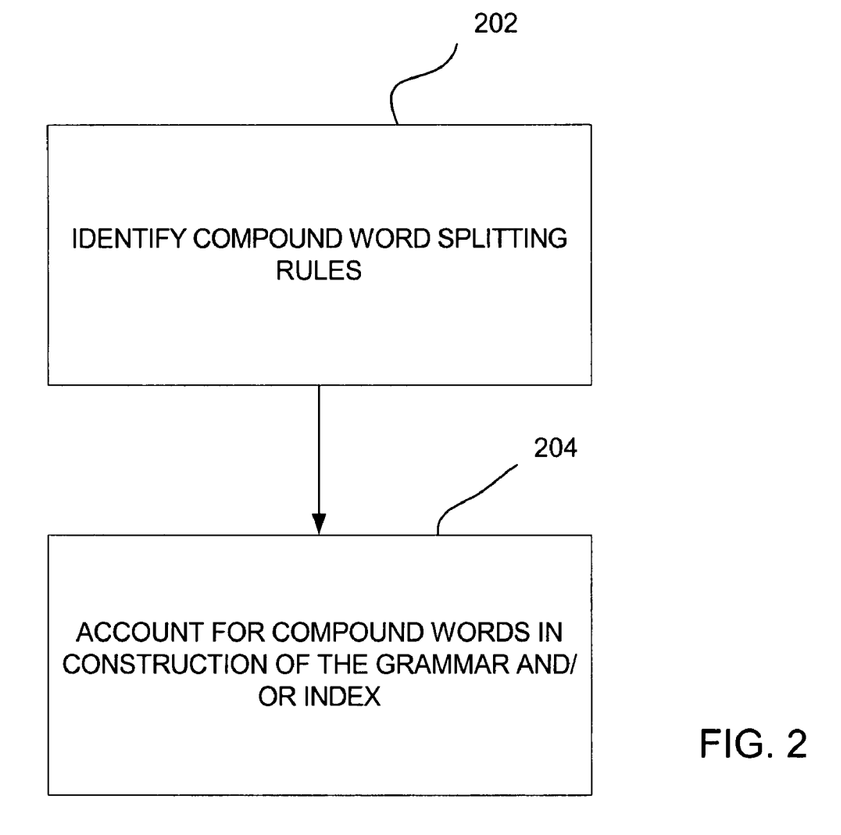
FIG. 2 is a flow chart demonstrating steps associated with addressing challenges associated with compound words.

FIG. 2 is a flow chart demonstrating, on a high level, steps associated with addressing challenges associated with compound words. In accordance with step 202, rules are identified for splitting compound words. In accordance with step 204, the splitting rules are applied in order to account for compound words in the construction of the grammar 108 and/or index 112 (FIG. 1).

Accordingly, one aspect of the present invention pertains to methods for finding compound word splitting rules. A simple approach for identifying compound word splitting rules is to separate each word at an arbitrary character boundary and then check to see whether each part is a word (e.g. by comparing against a language model, etc.). There are several disadvantages associated with such an approach. First, it is very inefficient. Since some compound words can be split into more than two parts, the system basically needs to check all possible combinations of word splitting. For example, the system must assume that a particular entry can be split into 4 words, 3 words, 2 words, etc. Eat all possible character positions. Another disadvantage is that it is difficult to equip such a system to account for the fact that some words are a combination of 2 words but should not be split (e.g., Pullman) since splitting may change the pronunciation and may introduce unnecessary complexity. A third disadvantage is that it is difficult to equip the system to select a most correct splitting rule in situations where a given word can be split at two different positions (e.g., nowhere can be split as "no where" or "now here"). For at least these reasons, there is a need for an alternate approach.

Figure 3:
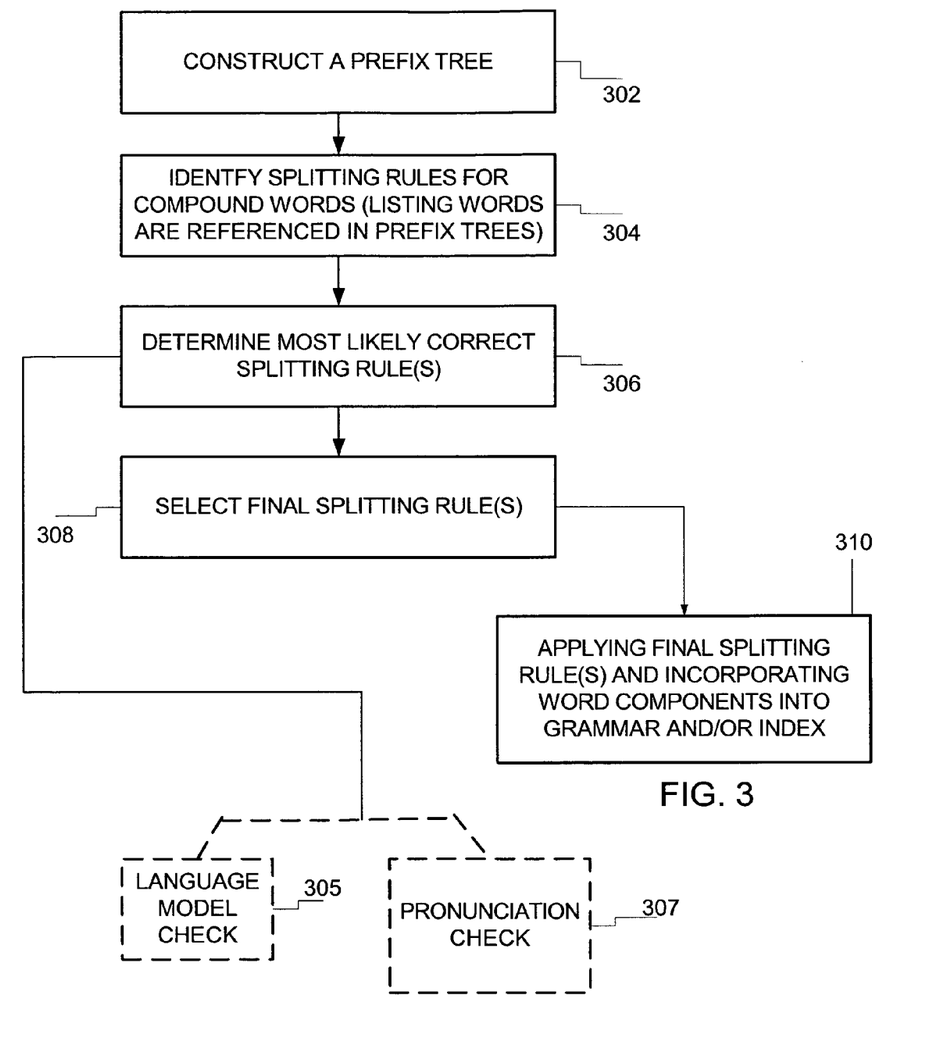
FIG. 3 is a flow chart diagram demonstrating steps associated with an approach to identifying splitting rules.

FIG. 3 is a flow chart diagram demonstrating steps associated with an alternate approach to identifying splitting rules. In accordance with block 302, a first step involves constructing a prefix tree. In one embodiment, the tree is constructed based on references to a source collection of words in alphabetical order. In one embodiment, the source collection is a dictionary. In another embodiment, the source collection is a lexicon used by a speech recognition engine (e.g., a lexicon associated with query recognizer 106).

Figure 4:
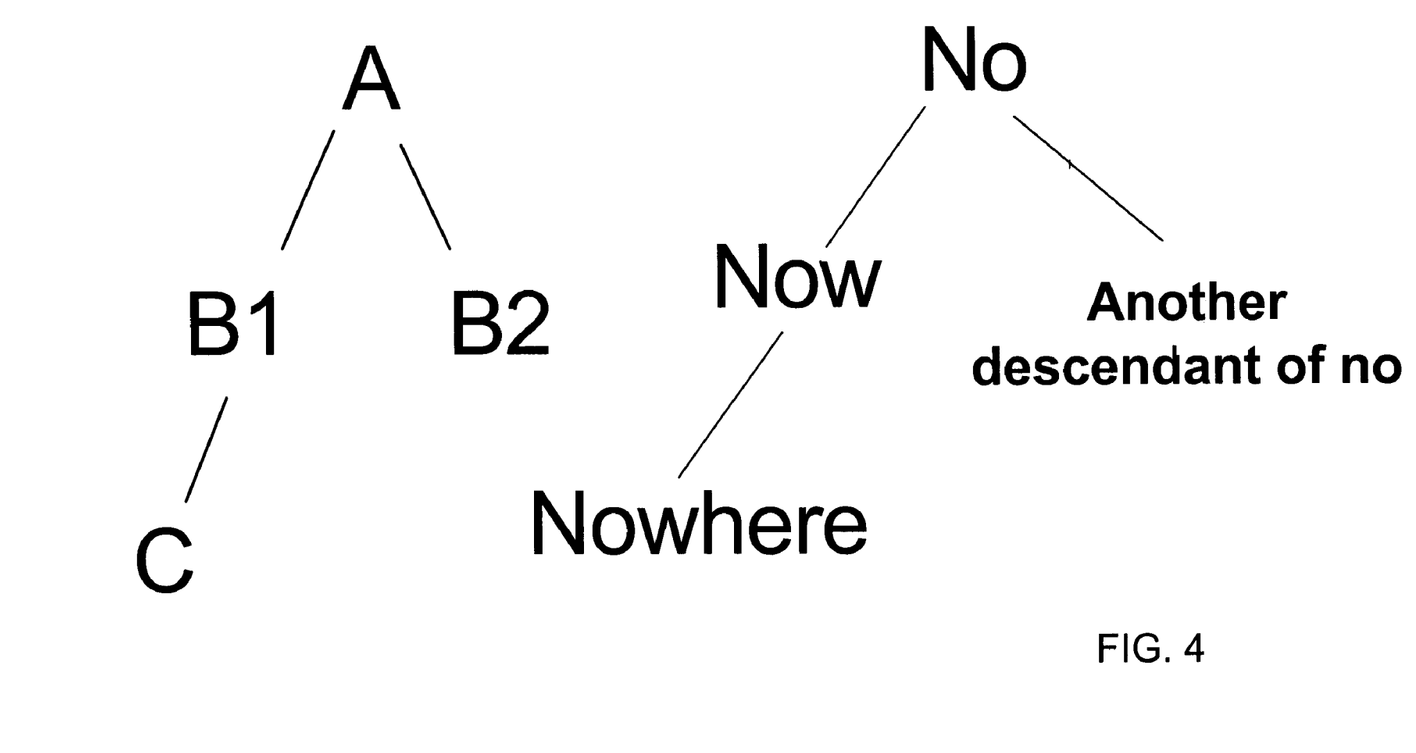
FIG. 4 is a schematic representation of the organization of a prefix tree.

Utilizing the source collection as a reference, the prefix tree is constructed such that each word that contains another word is established as a descendant of the word being contained. For example, each word "B" is a descendent of word "A" if word "A" is a prefix of "B" in the dictionary and there exists no word "C" such that A is a prefix of C and C is a prefix of B. FIG. 4 is a schematic representation of the organization of a prefix tree, wherein B1 ("NOW") is a descendant of A (NO), and wherein C (NOWHERE) is a descendant of B1 (NOW). In one textual format, the tree might look something like:

No->now->nowhere
No->(other descendents of no such as "not")

Assuming the source collection of words is ordered alphabetically, a prefix tree can be built very efficiently. (One possible algorithm is: S1: If the new word is a prefix of the previous word, put the new word as a descendent of the previous word; S2: else, set the previous word to be the parent of the previous word, go back to S1.) A constructed tree effectively represents a collection of possible word splitting rules. However, it isn't yet known what words in listing index 112 are compound.

In accordance with block 304, a determination is made as to which words in listing index 112 are compound. Also, splitting rules are identified for the compound words. In one embodiment, since it is unknown at the outset which words are compound, all words in each listing are checked (although a filter such as a lexicon or dictionary can be applied to eliminate checking certain terms such as a, and, the, or any other term that predictably might not be useful if processed further). To check, an appropriate position in the prefix tree is referenced for each word. For example, given the example above, by referencing the prefix tree, it becomes known that "nowhere" can be split into either "no where" or "now here." This is done by traversing the parent nodes of the word to be considered. In this case, the algorithm first checks the direct parent of Nowhere which is Now. This indicates that Nowhere can be split into Now Here. The algorithm further moves up the tree and find No indicating that Nowhere can also be split into No Where. The same process is carried out for "where" and "here" until each part can not be split into existing words any more. Assuming "where" and "here" can not be split into existing words, the process is stopped.

Following step 304, possible splitting rules are known. In the running example, the processing of "nowhere" leads to two splitting rules, which are:
1) Nowhere->no where
2) Nowhere->now here At this point, what is not known is which rules are correct for given word (even if there is only one identified splitting rule, it's still not sure whether the identified splitting rule is correct, e.g., Pullman should not be split into Pull Man since the pronunciation of the split words is different from the compound word). In accordance with step 306, a determination is made as to which, for a given word having multiple identified splitting rules, is the most likely correct rule, or none of the rules are correct.

In one embodiment, the determination of the correct splitting rule is based on a check of at least two factors, namely, a language model score (language model check 305) and pronunciation (pronunciation check 307). For a given word, all possible splitting rules are illustratively sorted into descending order based on the number of parts into which the word is split. A rule check is then made in that order (i.e., if one or more rules lead to splitting a word into 3 parts, then those rules are checked first, then two part rules are checked, etc.). It should be noted that processing in descending order is not a required feature. In one embodiment, fewer than all possible rules are checked. In this situation, processing in descending order reflects a preference for words that are split into more sub-word components.

In accordance with one embodiment of block 305, a rule check involves first determining the number of times the split words happen in a collection of documents. The present invention is not necessarily limited to this specific implementation of considering a language model score. In another embodiment, the language model check involves determining the probability that a corresponding tri-gram or bi-gram happens within a language model (LM). Those skilled in the art will appreciate that other possibilities are also within the scope of the present invention. To accept a given splitting rule, the split words need to occur together frequently. This is illustratively controlled using a threshold.

In accordance with block 307, assuming that a given rule passes the LM check (i.e., surpasses an applicable threshold), then a check is made to determine whether the pronunciation will be changed if the word is split. This is done by comparing the pronunciation of the compound word and the pronunciation of the combination of the split words. If the pronunciations are the same, the possible rule survives. In one embodiment, the surviving possible rule that gives the best LM score is selected as the final splitting rule to be applied, in accordance with block 308, in further processing (it is also within the scope of the present invention to choose more than one final splitting rule).

Those skilled in the art will appreciate the order of the language model check and the pronunciation check could just as easily be reversed. In other words, pronunciation could be checked before the language model check.

In one embodiment, a language model check is utilized to overcome potential problems associated with pronunciation. The accuracy of pronunciations of proper nouns is typically worse than that of regular words. Some pronunciation systems, such as some systems configured for letter to sound or LTS pronunciation, use a breaking rule to break an unknown word into shorter components. The pronunciation becomes a concatenation of characteristics of the components. For this and other types of pronunciation systems, pronunciation is likely to be a loose concept. For the example of "Nowhere," many people may write it as "No where," so this very well may be the desirable way to break the word. It is very possible; however, that "Now here" might also pass a pronunciation check. A language model check enables this type of dilemma to be sorted out. For example, if it is most common to break into "Now where" and not "Now here," then the bigram "No where" will have a higher score than the one for "Now Here." Preferences can be imposed to favor pronunciations with higher scores.

In one embodiment, a language model check is utilized to improve the accuracy of pronunciation (e.g., letter to sound or LTS). For example, a language model score can be utilized to rank suggested pronunciations. Preferences can be imposed to favor pronunciations that rank higher.

In accordance with block 310, final splitting rules are utilized to support compound word processing. There are at least two different ways to do this. In a first approach, final splitting rules are applied to split compound words before grammar 108 (e.g., an automatic speech recognition grammar) is built. The split words are used to build both grammar 108 and the search index 112. Using this approach, the grammar output will not show the compound words. In other words, if a user 102 inputs "outback company," the grammar will not recognize the input as "outback company," but instead will recognize it as "out back company," or as "out buck company" if misrecognition occurs. Since the search index is also built upon the split words, the query processing component 110 searches for the listing based on the recognition result without problem. Even if part of the compound name is misrecognized, the correct listing can still be identified.

In a second approach, the compound words are used to build grammar 108 and the split words are used to build index 112. For example, in grammar 108, there is still the word "outback." However, in index 112, only "out back" appears. Thus, if a user 102 inputs "outback company," query recognizer 106 will recognize it as "outback company," "out back company" or "out buck company." The directory assistance system is illustratively configured to apply the final splitting rules to the query recognizer results before sending the results to query processing component 110. Thus, even if "outback" is the recognized query, it will become "out back" when passed to query processing component 110. Thus, no matter which form is recognized, the correct listing will be identified.

Thus, to summarize, one option is to utilize the split form for grammar 108 and index 112. Another option is to use the compound form in grammar 108 but use the split form in index 112. In the latter case, query normalization is conducted before index 112 is searched.

Figure 5:
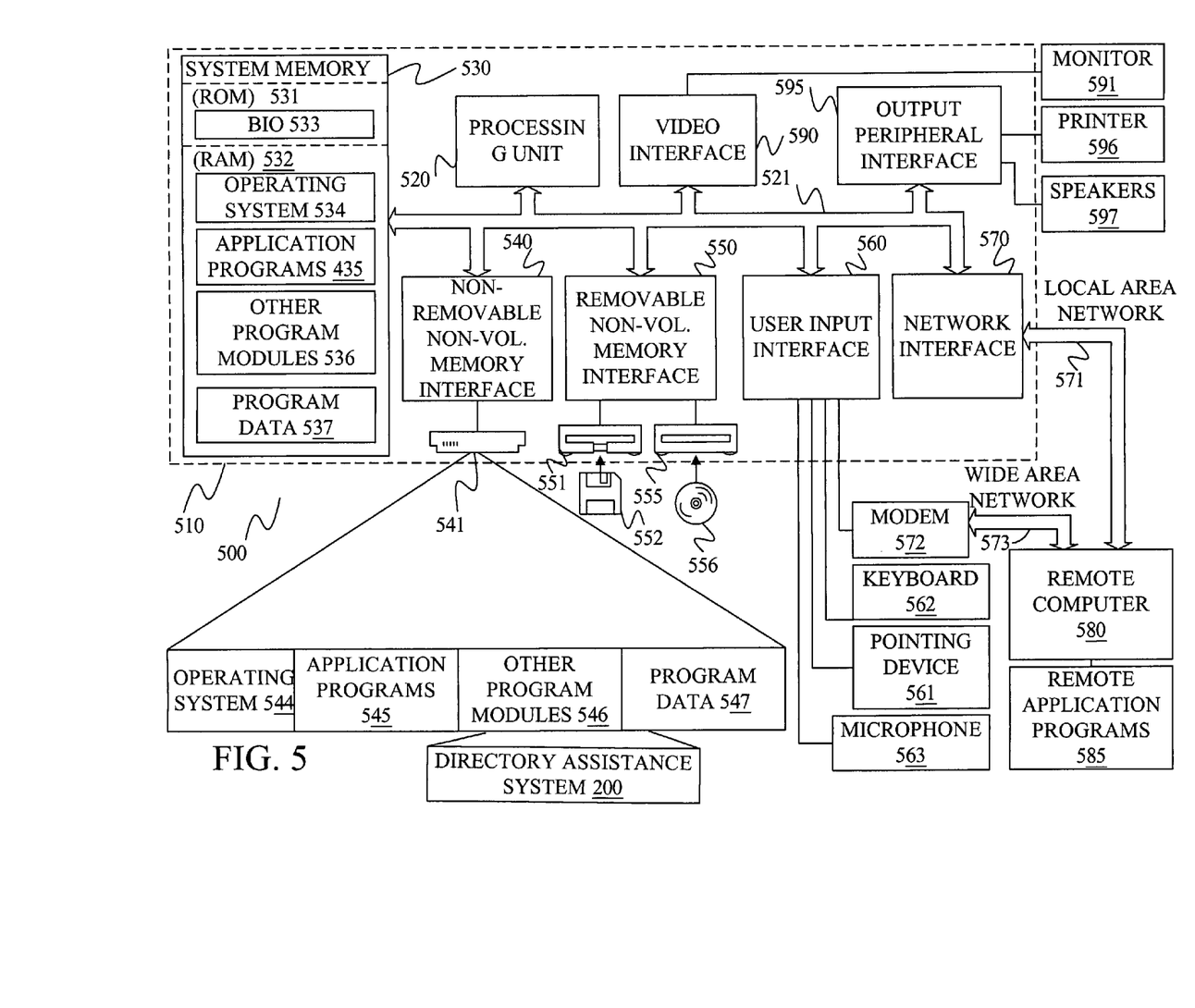
FIG. 5 illustrates an example of a computing system environment.

FIG. 5 illustrates an example of a suitable computing system environment 500 in which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives, and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. It can be seen that FIG. 5 shows directory assistance system 104 residing in other applications 546. Of course, it will be appreciated that system 104 can reside in other places as well, including in the remote computer, or at any other location that is desired.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of improving the accuracy of an automatic directory assistance system, comprising:
   obtaining a compound word;
   identifying a rule that specifies a way to split the compound word;
   applying the rule so as to split the compound word into a plurality of word components;
   utilizing a computer processor that is a component of a computing device to perform a pronunciation check by comparing an obtained pronunciation of the compound word with an obtained pronunciation of the plurality of word components;
   determining, based on the pronunciation check, that the obtained pronunciation of the compound word is different than the obtained pronunciation of the plurality of word components; and
   as a response to said determination, effectuating an exclusion of the plurality of word components from a data set that is a listing of identification candidates utilized by the directory assistance system as a reference for identifying a user-initiated input.

2. The method of claim 1, wherein the data set is a speech recognition grammar.

3. The method of claim 1, wherein the data set is a query processing index.

4. The method of claim 1, further comprising:
   identifying a second rule that specifies a second way to split the compound word;
   applying the second rule so as to split the compound word into a second plurality of word components, the first plurality of word components being different than the second plurality of word components;
   utilizing the computer processor to perform a second pronunciation check by comparing the obtained pronunciation of the compound word with an obtained pronunciation of the second plurality of word components;
   determining, based on the second pronunciation check, that the obtained pronunciation of the compound word is the same as the obtained pronunciation of the second plurality of word components; and as a response to the determination that the pronunciations are the same, effectuating an inclusion of the second plurality of individual word components within said data set.

5. The method of claim 1, wherein identifying a rule comprises constructing a prefix tree.

6. The method of claim 5, wherein constructing a prefix tree comprises constructing a prefix tree based on an alphabetically organized set of words that includes the compound word and the plurality of word components.

7. The method of claim 6, wherein the alphabetically organized set of words is a collection of dictionary words in the same language as the user-initiated input.

8. The method of claim 6, wherein the alphabetically organized set of words is a collection of words contained in a speech engine lexicon, the collection of words being in the same language as the user-initiated input.

9. The method of claim 4, further comprising performing a language model check to determine which of the first and second plurality of word components is more commonly utilized in a language system that is the same language as the user-initiated input.

10. A computer-implemented method of improving the accuracy of an automatic directory assistance system, comprising:

obtaining a compound word;

identifying a rule that specifies a way to split the compound word;

applying the rule so as to split the compound word into a plurality of word components;

utilizing a computer processor that is a component of a computing device to perform a pronunciation check by comparing an obtained pronunciation of the compound word with an obtained pronunciation of the plurality of word components;

determining, based on the pronunciation check, that the obtained pronunciation of the compound word is the same as the obtained pronunciation of the plurality of word components; and as a response to the determination that the pronunciations are the same, effectuating an inclusion of the plurality of individual word components within a data set that is a listing of identification candidates utilized by the directory assistance system as a reference for identifying a user-initiated input.

11. The method of claim 10, wherein the data set is a speech recognition grammar.

12. The method of claim 10, wherein the data set is a query processing index.

13. The method of claim 10, wherein identifying a rule comprises constructing a prefix tree.

14. The method of claim 13, wherein constructing a prefix tree comprises constructing a prefix tree based on an alphabetically organized set of words that includes the compound word and the plurality of word components.

15. The method of claim 14, wherein the alphabetically organized set of words is a collection of dictionary words in the same language as the user-initiated input.

16. A computer-implemented method of improving the accuracy of an automatic directory assistance system, comprising:

obtaining a compound word;

identifying a rule that specifies a way to split the compound word;

applying the rule so as to split the compound word into a plurality of individual word components;

utilizing a computer processor that is a component of a computing device to compare an obtained pronunciation of the compound word with an obtained pronunciation of the plurality of individual word components;

if the comparison indicates that the pronunciations are the same, then accepting the rule and thereby allowing the plurality of individual word components to be included in a data set that is a listing of identification candidates utilized by the directory assistance system as a reference for identifying a user-initiated input; and if the comparison indicates that the pronunciations are different, rejecting the rule and thereby establishing a prohibition against including the plurality of individual word components in the data set.

17. The method of claim 16, identifying a rule comprises constructing a prefix tree based on an alphabetically organized set of words that includes the compound word and the plurality of word components.

18. The method of claim 17, wherein the alphabetically organized set of words is a collection of dictionary words in the same language as the user-initiated input.

19. The method of claim 18, wherein the alphabetically organized set of words is a collection of words contained in a speech engine lexicon, the collection of words being in the same language as the user-initiated input.

* * * * *